J. EBERHARD.
PORTABLE TRACK VEHICLE.
APPLICATION FILED MAR. 27, 1914.

1,151,251.

Patented Aug. 24, 1915.

Witnesses:
Hyperion Barry.
F. George Barry.

Inventor:
Jacob Eberhard
by his attorneys
Brown & Seward

UNITED STATES PATENT OFFICE.

JACOB EBERHARD, OF KREUZNACH-ON-THE-NAHE, GERMANY, ASSIGNOR TO THE FIRM OF RADIO-WAGENBAU-GESELLSCHAFT MIT BESCHRÄNKTER HAFTUNG, OF FRANKFORT-ON-THE-MAIN, GERMANY.

PORTABLE-TRACK VEHICLE.

1,151,251.  Specification of Letters Patent.  Patented Aug. 24, 1915.

Application filed March 27, 1914. Serial No. 827,647.

*To all whom it may concern:*

Be it known that I, JACOB EBERHARD, manufacturer, citizen of the German Empire, and resident of Kreuznach - on - the-Nahe, Germany, with the post-office address 23 Viktoriastrasse, have invented new and useful Improvements in Portable - Track Vehicles, of which the following is a specification.

This invention relates to a portable track vehicle the body of which runs, by means of rollers, on two track rings of large diameter, each of said rollers being separately spring mounted. Track rings have already been proposed for transporting steam rollers, wagons or the like, but these are similar to a four-wheeled vehicle, being provided with four track rings and therefore dependent on one another. Furthermore, the rollers are mounted on fixed bogie trucks, so that the vehicle frame is only supported at one point on each track ring, whereas in the portable track vehicle forming the subject of this invention the vehicle body rests at two points on a track ring on either side and can therefore slide more easily within the track ring, thus lessening the pull required to draw the vehicle and relieving the horse. The low position of the vehicle body enables the vehicle to be loaded and unloaded with ease and convenience.

Figure 1:
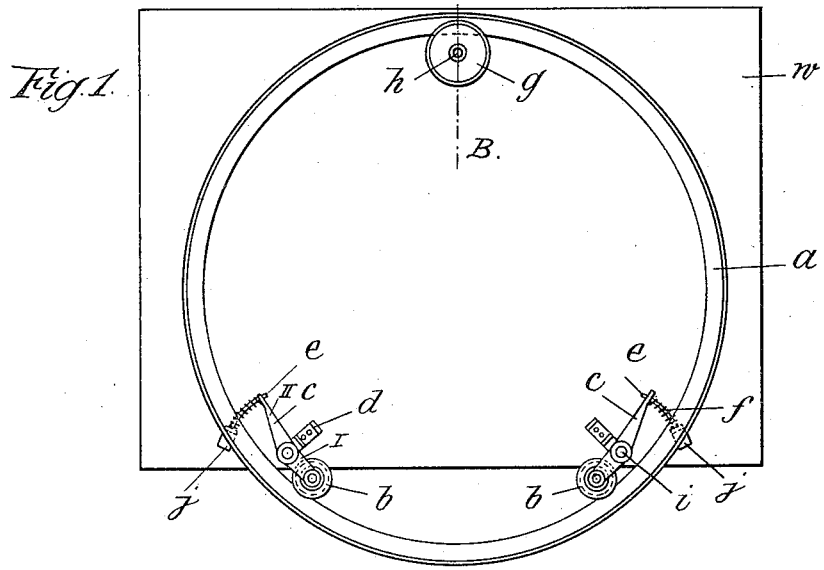
Figure 2:
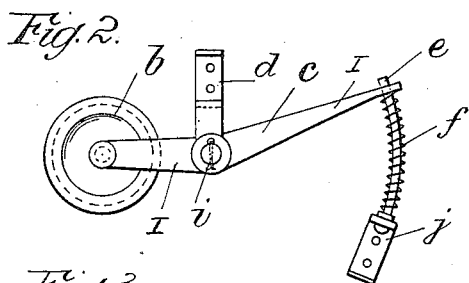
Figure 4:
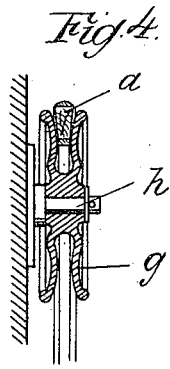
Figure 3:
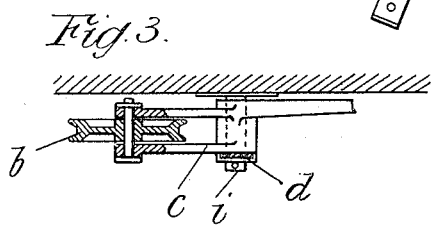
Figure 5:
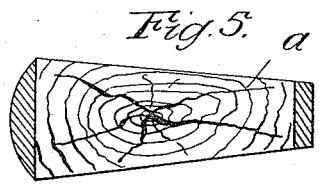

Referring to the accompanying drawings Figure 1 is a side elevation showing a track ring with three rollers, the vehicle body being shown diagrammatically; Fig. 2 shows on a larger scale one of the rollers with its spring mounting; Fig. 3 is a sectional plan thereof; Fig. 4 is an enlarged section on the line B, Fig. 1; and Fig. 5 is a still larger section through the track ring.

The vehicle consists of the body $w$ having spring-mounted rollers $b$ which run on a track ring $a$. The rollers $b$ are each carried by a lever $c$ pivoted to the body $w$ on a fixed pin $i$. At the other end of each lever $c$ is arranged a strong spring $f$ supported by a curved rod $e$ secured to the vehicle body by a bracket $j$. These springs $f$, $f$ absorb any vibrations of the track ring $a$ and replace the usual vehicle axle springs. The upper roller $g$ is rotatably mounted on the vehicle body by the pin $h$, and is of such form that the track ring cannot move out of engagement therewith.

The track ring itself may be made of wood, millboard, pulp or the like, and provided in the usual way with rubber tires or the like. The sectional shape may vary according to the purpose in view. By providing a track ring of about eighty inches in diameter the running of the vehicle is facilitated. In addition side doors for loading the vehicle may be provided, and the rollers can be arranged in such a manner as to raise the vehicle body any desired height above the ground or so that one roller has to carry a greater proportion of the load than another. The rollers may also be so arranged that the vehicle can be tipped for unloading.

Now what I claim and desire to secure by Letters Patent is the following.

A portable track vehicle comprising a body, two track rings arranged one on either side of said body, two rollers on each side of the body engaged on said track rings, levers pivotally mounted on said body each carrying one of said rollers, springs acting on said levers and a third roller on each side of the body in position to engage and guide each of said track rings.

In testimony, that I claim the foregoing as my invention, I have signed my name in presence of two witnesses, this 14th day of March 1914.

JACOB EBERHARD.

Witnesses:
 FRANZ DIETZ,
 OSCAR BERNSTEIN.